(12) United States Patent
Bao

(10) Patent No.: US 12,535,047 B2
(45) Date of Patent: Jan. 27, 2026

(54) OCEAN WAVE POWER SYSTEM AND METHOD

(71) Applicant: Kiew Wu Bao, Selangor (MY)

(72) Inventor: Kiew Wu Bao, Selangor (MY)

( * ) Notice: Subject to any disclaimer, the term of this patent is extended or adjusted under 35 U.S.C. 154(b) by 0 days.

(21) Appl. No.: 18/850,122

(22) PCT Filed: Feb. 21, 2023

(86) PCT No.: PCT/MY2023/050010
§ 371 (c)(1),
(2) Date: Sep. 24, 2024

(87) PCT Pub. No.: WO2024/177497
PCT Pub. Date: Aug. 29, 2024

(65) Prior Publication Data
US 2025/0215849 A1    Jul. 3, 2025

(51) Int. Cl.
*F03B 13/22* (2006.01)
*F03B 13/18* (2006.01)

(52) U.S. Cl.
CPC .......... *F03B 13/22* (2013.01); *F03B 13/1815* (2013.01)

(58) Field of Classification Search
CPC ...... F03B 13/20; F03B 13/22; F03B 13/1815; F03B 13/24; F03B 13/188; F03B 13/145; Y02E 10/30; F05B 2240/242
See application file for complete search history.

(56) References Cited

U.S. PATENT DOCUMENTS

| | | | |
|---|---|---|---|
| 4,400,940 A | 8/1983 | Watabe et al. | |
| 4,490,621 A | 12/1984 | Watabe et al. | |
| 5,217,324 A | 6/1993 | Freelain | |
| 2010/0201131 A1 | 8/2010 | Peralta | |
| 2011/0018276 A1 | 1/2011 | Whittaker et al. | |
| 2016/0061180 A1* | 3/2016 | Eavis | F03B 13/182 417/330 |
| 2020/0088155 A1 | 3/2020 | Von Bulow et al. | |

FOREIGN PATENT DOCUMENTS

| | | |
|---|---|---|
| CN | 108953047 A | 12/2018 |
| WO | 2004007953 A1 | 1/2004 |
| WO | 2007125156 A1 | 11/2007 |
| WO | 2011079199 A1 | 6/2011 |
| WO | 2014053839 A1 | 4/2014 |
| WO | 2014107105 A1 | 7/2014 |

* cited by examiner

*Primary Examiner* — Joseph Ortega
(74) *Attorney, Agent, or Firm* — Renner, Kenner, Grieve, Bobak, Taylor & Weber Co. LPA

(57) ABSTRACT

A wave energy converter apparatus comprising a floatable wave receiver unit with first and second chambers that extend and retract in response to wave motion, a power conversion and generation module disposed on a float unit that floats in the body of water and a connection assembly connecting the wave receiver unit to the power conversion and generation module. The second chamber includes an open front end to hold the first chamber, allowing partial horizontal axial movement. The assembly includes a hydraulic cylinder and a connecting structure that transfer wave motion energy to the cylinder. As the first chamber moves forward into the second chamber, the hydraulic fluid in the cylinder becomes pressurized. The pressurized fluid powers the hydraulic motor, which in turn drives the generator. A flexible corrugated shield surrounds the side panels of both chambers to prevent water entry.

18 Claims, 7 Drawing Sheets

OCEAN WAVE POWER SYSTEM AND METHOD

FIELD OF INVENTION

The present invention relates generally to the field of energy generation, and more particularly, to the field of wave energy converting apparatus and generating system for producing electrical energy from wave energy.

BACKGROUND OF THE INVENTION

Oceans and seas cover more than 70 percent of the Earth's surface and contain an enormous untapped source of renewable energy in the form of waves, despite decades of development efforts. The natural oscillations of ocean wave have concentrated source of kinetic energy which are created by the action of wind and moon gravitational force passing over the ocean's surface, and can be converted into electricity. Waves occur in the volume of the water closest to its surface.

The survivability of the wave energy conversion systems in extreme conditions such as high and low tides which result in constant changing of sea levels, unpredictable severe weather and heavy storms, seasonable variations and corrosion of sea water, is another major issue.

Most of the prior technologies for generating power from waves utilize flotation method and system for harnessing the vertical motion of the wave's energy and converting to electrical energy. However, these inventions are inefficient in converting wave energy into electric energy commercially. Only a small fraction of wave energy is converted into electrical energy. A substantial amount of wave energy is lost.

In these method and system, the energy output of the linear up-down motion of waves is proportional to its surface area and thus has limited energy output. Furthermore, the system covers only a relatively small area of the sea and therefore wave energy harvesting is limited. As such, a large number of wave energy conversion units will be needed, resulting in higher installation and maintenance costs. Flotation methods do not work well in the ocean or sea due to water resistance, long response time and fast travelling waves, and also the system being too heavy.

The energy of the sea waves is concentrated and highest at the surface, thus the wave energy technologies which are installed below the surface of the sea will generate very little energy. Additionally, the wave energy systems built so far have experienced a low efficiency in the conversion of the sea wave energy to other forms of energy source. If the systems are installed on land, one may need approval for land use and suitable locations are also limited. If the systems are installed underwater, it could be risky to marine life or passing boats or ships.

Another renewable source of energy that can be harvested from the ocean or sea is tidal energy. Tidal energy system includes large underwater turbines which are installed in areas with high tidal movements to capture the kinetic motion of the surging of ocean or sea tides in order to produce electricity. However, challenges to generate electricity by tidal energy include high upfront costs and low efficiency as well as high maintenance cost as there are limited locations with sufficient flow of current. Furthermore, the large turbine may accidentally kill fishes and marine life, and causes silting problems.

Numerous system and methods of producing energy from waves are being explored and evaluated in an effort to tap into sustainable energy resource.

For example, a wave energy conversion apparatus that includes a buoy, a venturi tube and a rigid or flexible means for connecting the buoy and the venturi tube is disclosed in the U.S. Pat. No. 8,925,313 B2. The buoy is adapted to float on a water surface. The venture tube defines a lumen through which water flows downward when the buoy moves upward and downward. A constriction is formed in the lumen for creating a venturi effect for water flowing upward and downward through the lumen. A turbine is positioned in the lumen at the constriction where water flow is at a maximum rate. The turbine is connected to a generator in order that the venturi effect is harnessed to generate power.

U.S. Pat. No. 8,120,195 B2 discloses a wave energy converter system for obtaining electrical energy from sea waves. The system comprises an elongated elastic tube device which floats at the sea surface and extends at least partially parallel to the direction of wave propagation. The tube bends as the wave passes by and the tube bending stretches and relaxes SSM (synthetic stretchable material) which generates electricity in electrodes when the amount of stretching changes.

Most of the systems are not developed and implemented commercially or for a sufficiently long time due to the sea conditions and issues above, and lack of practical and cost-effective technologies and strategies.

This invention thus aims to alleviate some or all of the problems of the prior art.

SUMMARY OF THE INVENTION

In accordance with an aspect of the invention, there is provided a wave energy converter apparatus capable of converting and generating electric energy from wave energy.

The present invention as defined in amended claim 1 discloses a wave energy converter for generating electricity from wave motion. The apparatus features a floatable wave receiver unit comprising two chambers coupled to, and movable relative to each other in response to wave motion, to form an extensible and retractable unit. The first chamber includes a front panel attached to side panels with the front panel facing wave motion while the second chamber has a rear panel attached to side panels and an open front end to receive the first chamber to enable horizontal axial movement between the chambers. A flexible corrugated shield is peripherally disposed about the side panels of the first and second chambers to prevent water from entering the chambers. A power conversion and generation module, disposed on a float unit, houses a hydraulic motor and a generator for electricity generation. A connection assembly integrates a hydraulic cylinder and a connecting structure which connects the hydraulic cylinder and the front panel of the first chamber such that wave motion energy is transferred to the hydraulic cylinder through the connecting structure due to forward displacement of the first chamber into the second chamber caused by wave motion acting on the front panel. The chamber displacement pressurizes the hydraulic fluid in the hydraulic cylinder into the hydraulic motor to drive the generator.

In accordance with another aspect of the invention, there is provided a wave energy converter system comprising a platform including a plurality of pillars, whereby the base end of each of the pillars is anchored to a bed of a body of water and the top end is attached to the platform. A plurality of floatable wave receiver units is arranged in a row and disposed vertically at one side of the platform in the path of oncoming waves. Each of the wave receiver units comprises first and second chambers coupled to, and movable relative to each other in response to wave motion, to form an extensible and retractable wave receiver unit. The first chamber has a front panel attached to side panels and the second chamber has a rear panel attached to side panels and an open front end for receiving the first chamber to enable horizontal axial movement between the first and second chambers. A flexible corrugated shield is peripherally disposed about the side panels of the first and second chambers to prevent water from entering the chambers. A plurality of connection assemblies, each assembly having one end attached to a wave receiver unit and including a hydraulic cylinder containing hydraulic fluid and an elongated rod with a piston.

A power conversion and generation module including a hydraulic motor and a generator for generating electricity, is disposed on the platform. Each connection assembly includes a connecting structure connecting the connection assembly and the front panel of the first chamber of a wave receiver unit such that wave motion energy is transferred to the elongated rod and piston of the connection assembly. Movement of the elongated rod and piston pressurizes hydraulic fluid in the hydraulic cylinder and pushes the pressured hydraulic fluid through an outlet port of the connection assembly into the hydraulic motor for driving the generator.

In accordance with yet another aspect of the invention, there is provided a method for converting energy from sea or ocean waves.

The method comprises the steps of providing a floatable wave receiver unit comprising first and second chambers coupled to, and movable relative to each other in response to wave motion, to form an extensible and retractable wave receiver unit. The first chamber has a front panel attached to side panels with the front panel facing wave motion and the second chamber has a rear panel attached to side panels and an open front end for receiving the first chamber to enable horizontal axial movement between the first and second chambers. A flexible corrugated shield is peripherally disposed about the side panels of the first and second chambers to prevent water from entering the chambers. Providing a connection assembly with one end attached to the wave receiver unit, whereby the connection assembly comprises a hydraulic cylinder containing hydraulic fluid and a connecting structure. Providing a power conversion and generation module having a hydraulic motor and a generator for generating electricity from wave motion, the module being disposed on a float unit that floats in a body of water.

BRIEF DESCRIPTION OF THE DRAWINGS

Embodiments of the invention will now be described by way of example only, and with reference to the accompanying drawings in which.

Figure 1:
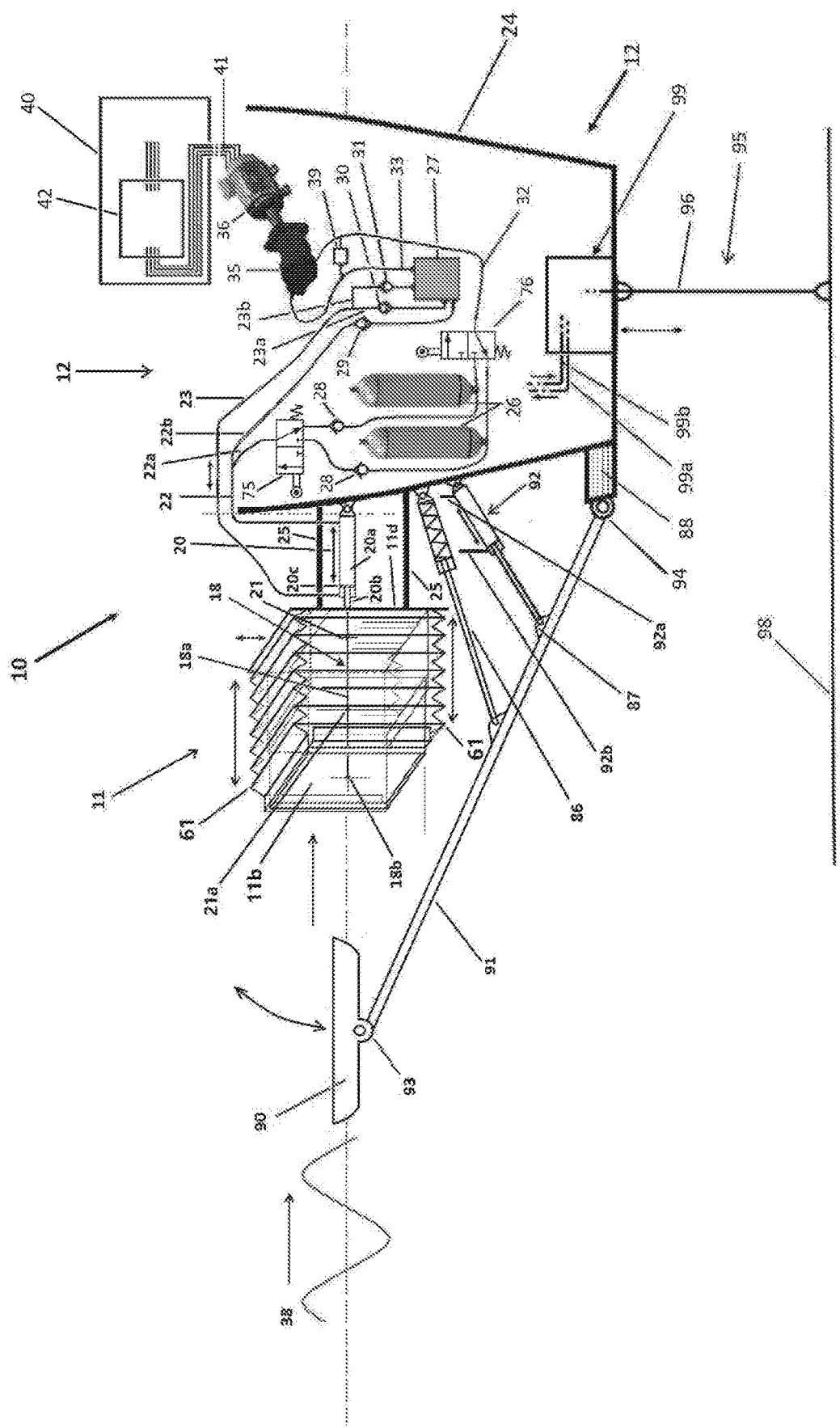
FIG. 1 is a schematic view of a wave energy converter apparatus of an embodiment of the invention.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

Detailed Description of the Embodiments

Referring now to the drawings, one of ordinary skill in the art will appreciate the many possible applications and variations of the present invention based on the following examples of possible embodiments of the present invention. The figures are not necessarily drawn to scale, and in some instances the drawings have been simplified for illustrative purposes only.

Referring to FIG. 1, there is shown a wave energy converter apparatus 10 according to an embodiment of the invention. The wave energy converter apparatus 10 comprises a wave receiver unit 11, a power conversion and generation module 12, and a buoyant body 90. The wave energy converter apparatus 10 includes a connection assembly 20 having one end attached to the wave receiver unit 11 and the other end attached to the power conversion and generation module 12. The buoyant body 90 is attached to the power conversion and generation module 12 by a connecting arm 91 as shown in FIG. 1.

Figure 2:
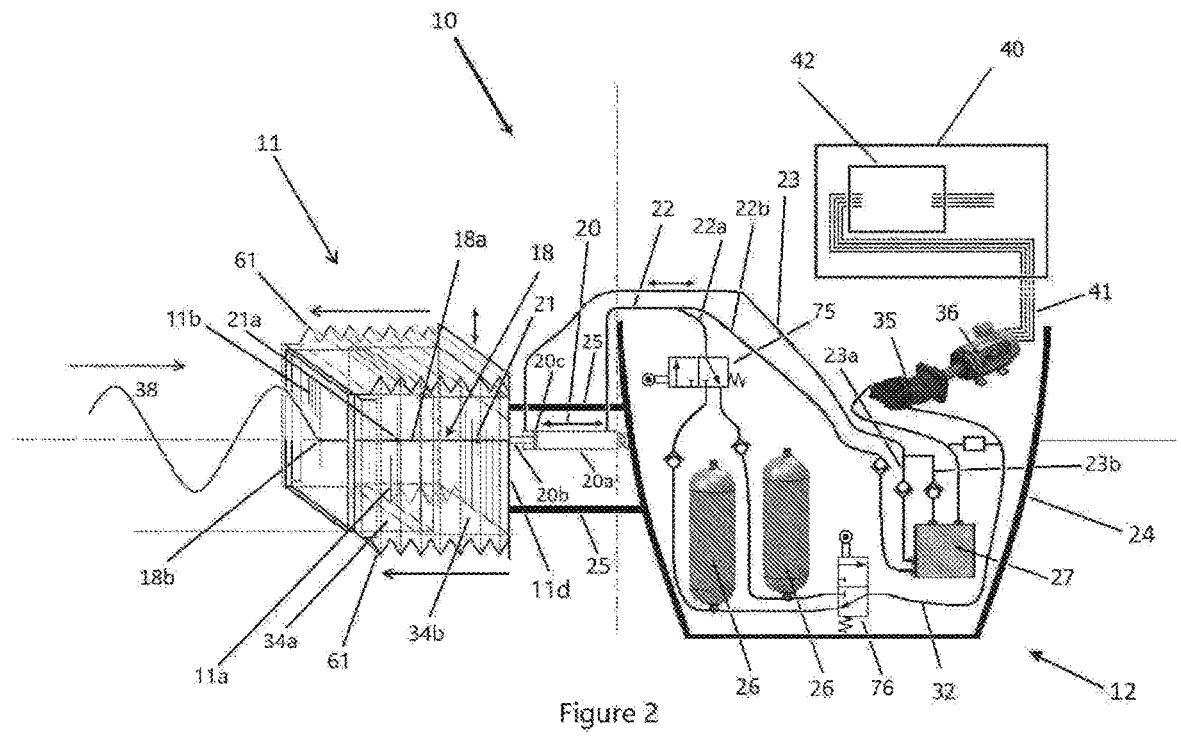
FIG. 2 is a schematic view of the wave energy converter apparatus of the present invention showing the wave receiver unit in an extended position.
Figure 3:
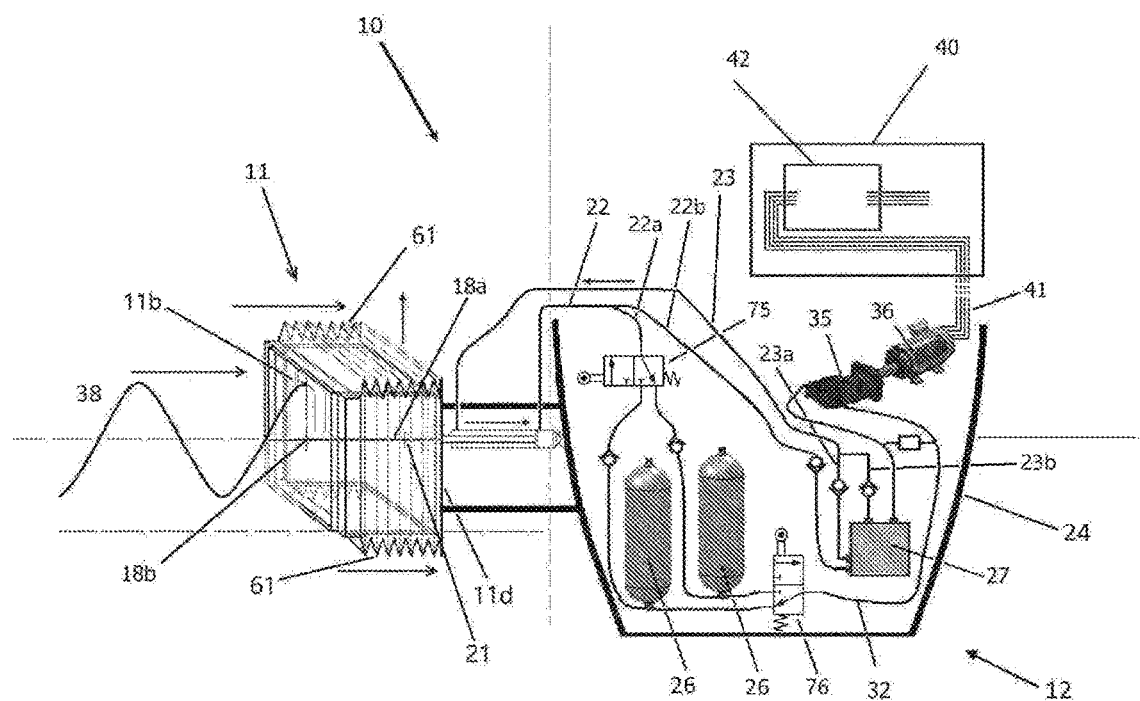
FIG. 3 is a schematic view of the wave energy converter apparatus of the present invention showing the wave receiver unit in a compressed position.

The wave receiver unit 11 is constructed by two box-like chambers, namely a first chamber 34a and a second chamber 34b, slidably coupled to each other so as to allow one chamber movable relatively to another chamber inwardly and outwardly for forming an expandable and contractible wave receiver unit 11 as shown in FIGS. 2 and 3. The first chamber 34a includes a front panel 11b attached to side panels 11c and a closed rear end 11a to form the box-like structure. The second chamber 34b includes a rear panel 11d attached to side panels 11e and a front open end to form another box-like structure. The front open end of the second chamber 34b is formed with its opening larger than the closed rear end 11a of the first chamber 34a so as to allow the closed rear end 11a of the first chamber 34a to be slidably fitted into the opening of the front open end of the second chamber 34b for sliding engagement therebetween. The side panels 11c, 11e of both first and second chambers 34a, 34b are covered with flexible corrugated shields 61 to form an extensible and retractable wave receiver unit 11, with one end of the flexible corrugated shield attached to side panels 11c of the first chamber and the other end attached to side panels 11e of the second chamber.

The connection assembly 20 is a piston unit which includes a cylinder 20a having a closed end and a horizontally spaced opposing open end, and an elongated rod 20b with one end attached to a piston 20c and the other end extended through the open end of the cylinder 20a. The cylinder 20a of the connection assembly 20 is filled with a hydraulic fluid such as hydraulic oil. The piston 20c is disposed and movable back and forth in the cylinder 20a between the closed end and the open end. The connection assembly 20 is attached to the power conversion and generation module 12 at its closed end and to the wave receiver unit 11 at its open end with the elongated rod 20b extended into the chamber of the wave receiver unit 11 through an opening 21 provided at the rear panel 11d of the second chamber 34b and a corresponding opening 21a at the closed rear end 11a of the first chamber 34a. The connection assembly 20 includes an outlet port provided adjacent the closed end and connected with a first connecting pipe 22, and an inlet port provided adjacent the open end and connected with a second connecting pipe 23.

A connecting structure 18 comprises a shaft 18a having one end connected to the elongated rod 20b of the connection assembly 20 and a pivotal connection 18b provided at the other end of the shaft 18a for attaching to an inner surface of the front panel 11b as shown in FIG. 2.

Figure 4:
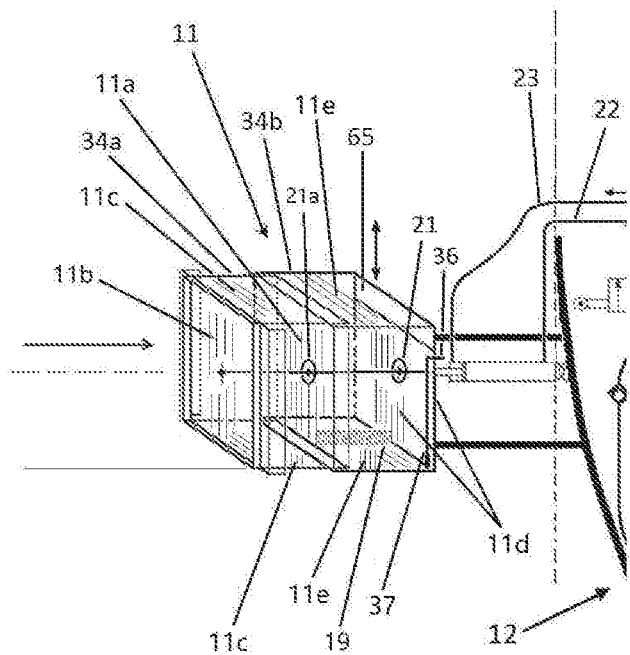
FIG. 4 is a partial perspective view of the wave receiver unit of one embodiment of the invention.

At least one resilient member 19 such as a spring member may be disposed within the chamber of the wave receiver unit 11, extending horizontally from an inner wall of the rear panel 11d and facing towards the external surface of the closed rear end 11a to urge the first chamber 34a to the extended position as shown in FIG. 4.

As the movable first chamber 34a reciprocates back and forth in the second chamber 34b of the wave receiver unit 11, the shaft 18a is forced through the openings 21, 21a of the rear panel 11d and closed rear end 11a, and pushed towards the elongated rod 20b of the connection assembly 20 when the receiver unit 11 is in compressed position as shown in FIG. 3. When the elongated rod 20b with the piston 20c of the connection assembly 20 slides inwards to the closed end of the cylinder 20a, it causes pressure to the hydraulic fluid in the cylinder 20a and forces the hydraulic fluid through the outlet port into the first connecting pipe 22 and eventually into the hydraulic accumulator 26 through pipe extension 22a. The hydraulic fluid in the oil storage tank 27 will be drawn out into the cylinder 20a of the connection assembly 20 through the second connecting pipe 23.

The first connecting pipe 22 connects the connection assembly 20 to the hydraulic accumulator 26 and the oil storage tank 27 via a pair of diverging pipe extensions 22a, 22b. One of the pipe extensions 22a may be coupled to one or more hydraulic accumulators 26 via a switching valve device 75 for selectively controlling the fluid flow to the hydraulic accumulator 26. An accumulator check valve 28 that allows the passage of fluid in a single direction is provided at each flow line coupled to each hydraulic accumulator 26. The other pipe extension 22b which is coupled to the oil storage tank 27 is provided with a storage check valve 29 to allow the passage of fluid in a single direction. In an embodiment of the invention, each accumulator check valve 28 provided at each flow line in between the switching valve device 75 and the hydraulic accumulators 26 prevent a backflow of fluid from the hydraulic accumulators 26 to the connection assembly 20, and the storage check valve 29 provided at the pipe extension 22b prevents a backflow of fluid from the connection assembly 20 to the oil storage tank 27 as shown in FIG. 2.

The second connecting pipe 23 connects the connection assembly 20 to the oil storage tank 27 via a pair of diverging pipe extensions 23a, 23b at a lower side wall and a top wall of the oil storage tank 27, respectively. A first linking check valve 30 and a second linking check valve 31 that allows the passage of fluid in a single direction is provided at each of the pipe extensions 23a, 23b, respectively.

The first linking check valve 30 provided at the pipe extension 23a allows the passage of fluid from the oil storage tank 27 to the connection assembly 20, and the second linking check valve 31 provided at the pipe extension 23b allows the passage of fluid from the connection assembly 20 to the oil storage tank 27 as shown in FIG. 1.

Each hydraulic accumulator 26 is connected to a switching control valve 76 for selectively controlling the fluid flow to the hydraulic motor 35 by a motor connecting pipe 32 and to the oil storage tank 27 by a tank connecting pipe 33. A pressure relief valve 39 is provided in between the motor connecting pipe 32 and the tank connecting pipe 33 as shown in FIGS. 1 to 3, for limiting the pressure in the system.

The power conversion and generation module 12 includes a float unit 24 such as a barge that floats on a surface of a body of water such as sea or ocean, and attached to the wave receiver unit 11. The barge 24 is attached to the outer wall of the rear panel 11d by at least one attaching member 25. In one embodiment of the invention, a pair of attaching members 25 is used for attaching both barge 24 and wave receiver unit 11 together, in which each of the attaching members 25 includes an arm support that extends from one side wall of the barge 24 and terminates with a hinge (not shown) secured at rear panel 11d of the wave receiver unit 11, that allows articulated motion as shown in FIGS. 2 and 3.

Other components such as hydraulic accumulators 26, oil storage tank 27, hydraulic motor 35 and electrical generator 36 may be disposed on the barge or float unit 24. The barge or float unit 24 is formed in a partial cylindrical shape in order for other components to be contained therewithin.

The wave receiver unit 11 floats on the water surface with its lower portion partially submerge in the sea or ocean. The wave receiver unit 11 is made of a corrosion-proof metal or synthetic material or similar sea water-resistant material. The chamber of the wave receiver unit 11 is hollow. During wave crest, the wave energy pushes towards the front panel 11b of the first chamber 34a to move into the second chamber 34b which impinges the shaft 18a of the connection assembly 20 as shown in FIG. 3. The wave receiver unit 11 captures the kinetic energy of the sea or ocean waves 38 and transfers to the connection assembly 20 via the connecting structure 18. During wave trough, which is a reflected wave results after the wave crest, the wave energy and the resilient member 19 moves the front panel 11b back to an extended position.

In use, the wave receiver unit 11 will be disposed on the water surface with the front panel 11b facing the oncoming wave's surge energy 38 as shown in FIG. 2. The front panel 11b of the first chamber 34a oscillates in response to wave action and the elongated rod 20b with the piston 20c of the connection assembly 20 is driven to cause the hydraulic oil in the cylinder 20a to be pressurized by the action of the piston 20c moved by the elongated rod 20b.

The hydraulic oil contained in the cylinder 20a undergoes both suction and force simultaneously. When the front panel 11b of the first chamber 34a of the wave receiver unit 11 moves from the extended position to the compressed position under wave loads, the shaft 18a of the connecting structure 18 will be pushed towards the rear panel 11d of the second chamber 34b of the wave receiver unit 11, which will, in turn push the elongated rod 20b as shown in FIG. 3. The cylinder 20a of the connection assembly 20 will suck in low pressure hydraulic oil from the oil storage tank 27 through the pipe extension 23a and pump high pressure hydraulic oil to the hydraulic accumulator 26 through the pipe extension 22a as the piston 20c moves towards the rear section of the cylinder 20a.

The wave energy is first converted into the high pressure hydraulic oil and stored in the hydraulic accumulators 26. When the oil pressure in the hydraulic accumulators 26 reaches a predetermined threshold, a switching control valve 76 provided at the motor connecting pipe 32 will be opened so that the high pressure hydraulic oil from the hydraulic accumulators 26 will be transferred to the hydraulic motor 35 for transferring mechanical energy to drive the electric generator 36 for generating electricity and transferring the electric power to shore 40 via submarine cable 41 to an electrical transformer 42. If the hydraulic oil pressure drops to a predetermined threshold, the switching control valve 76 will then be closed so that the hydraulic oil will be conserved in the hydraulic accumulators 26.

The wave receiver unit 11 includes an air vent 65 which is an opening provided at the top part of rear panel 11d for air entry into the second chamber 34b and for air exit out of the second chamber 34b during a wave trough and a wave crest. A water outlet 36 is also provided in the wave receiver unit 11 at the upper end of the rear panel 11d having an outlet pipe 37 connected to the water outlet 36 and downwardly extended to the bottom side panel of the wave receiver unit 11 as shown in FIG. 4. The water outlet 36 acts as a pressure differential outlet with an electric pump (not shown) for channelling excess water out of the chamber when the water level increases in the waver receiver unit 11.

Figure 5:
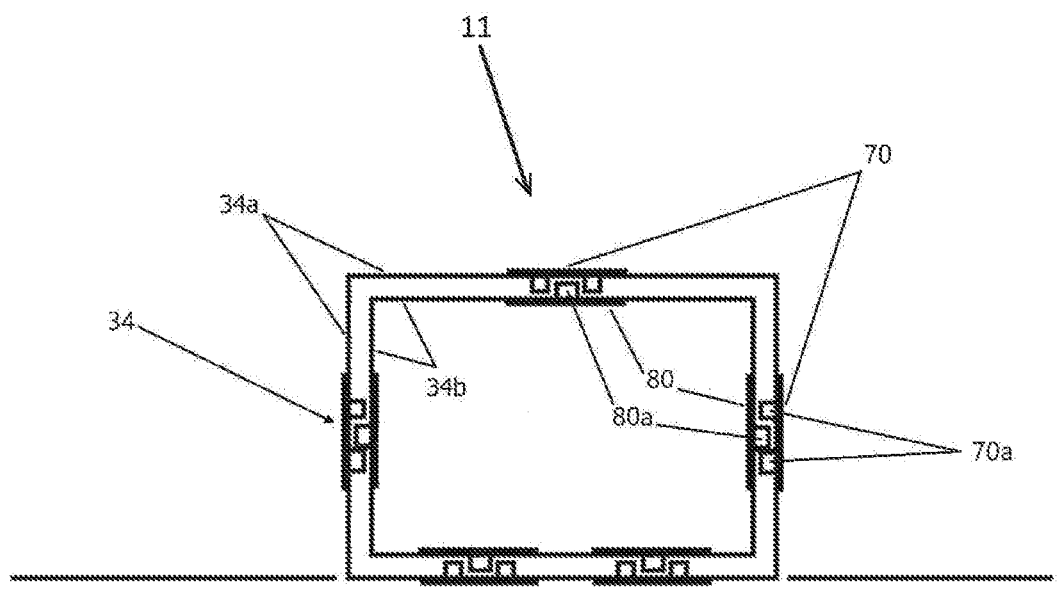
FIG. 5 is a cross sectional view of a sliding mechanism for use in the wave energy converter apparatus of the invention.

A sliding mechanism 34 is provided in between the first chamber 34a and the second chamber 34b to enable the first chamber 34a to be slidably fitted into the second chamber 34b. The first chamber 34a is formed with its outer container smaller than the outer container of the second chamber 34b. The first chamber 34a includes at least one base plate 80 provided at the outer surface of each side panel having an outwardly facing fitting rail 80a. The second chamber 34b includes at least one base plate 70 provided at the inner surface of each side panel having a pair of inwardly facing spaced apart guiding rails 70a. The outwardly facing fitting rail 80a is slidably fitted between the pair of guiding rails 70a when the first chamber 34a is fitted into the second chamber 34b as shown in FIG. 5.

Figure 7:
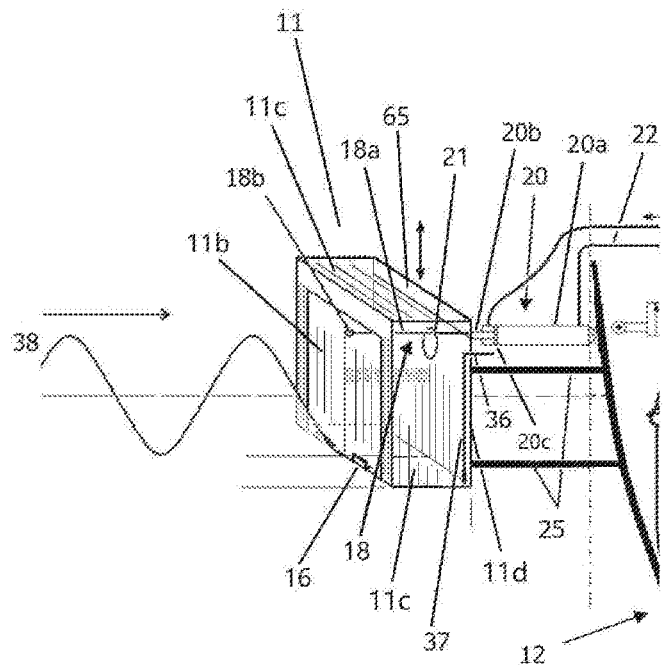
FIG. 7 is a partial perspective view of the wave energy converter apparatus showing the wave receiver unit of an embodiment of the invention with its front panel in a closed position.
Figure 8:
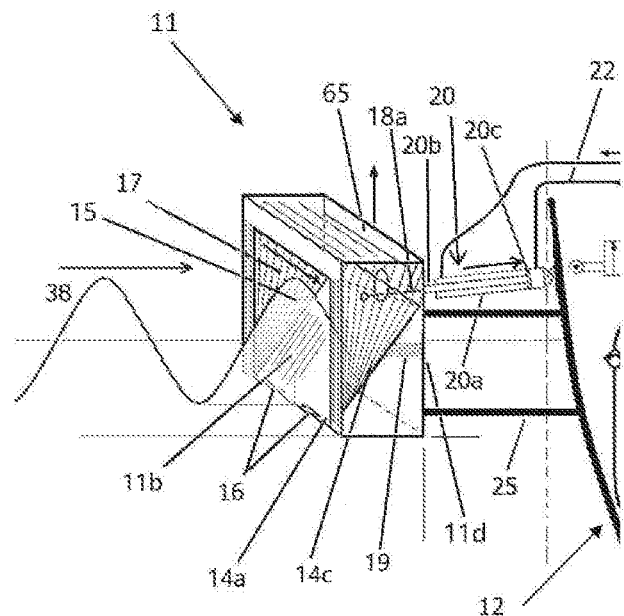
FIG. 8 is a partial perspective view of the wave energy converter apparatus showing the wave receiver unit with its front panel in an open position.

In another embodiment of the invention, the wave receiver unit 11 is generally formed in a box-like chamber or container that includes a rear panel 11d attached to side panels 11c and a movable front panel 11b as shown in FIGS. 7 and 8. The front panel 11b is pivotally hinged at one edge to a front edge of one of the side panels 11c for providing and covering an access opening 15 of the wave receiver unit 11. These panels extend normally along the vertical and horizontal planes, respectively. At least a portion of the front panel 11b or the entire front panel acts as an opening panel or movable front panel, and provided at the front access opening 15 for movements between one position to another.

In one embodiment of the invention, the front panel 11b of the wave receiver unit 11 is pivotally connected at a bottom edge by hinges 16 provided at a front bottom edge of the chamber. The front panel 11b is pivotable between a closed position and a partially open position as shown in FIGS. 7 and 8.

Figure 9:
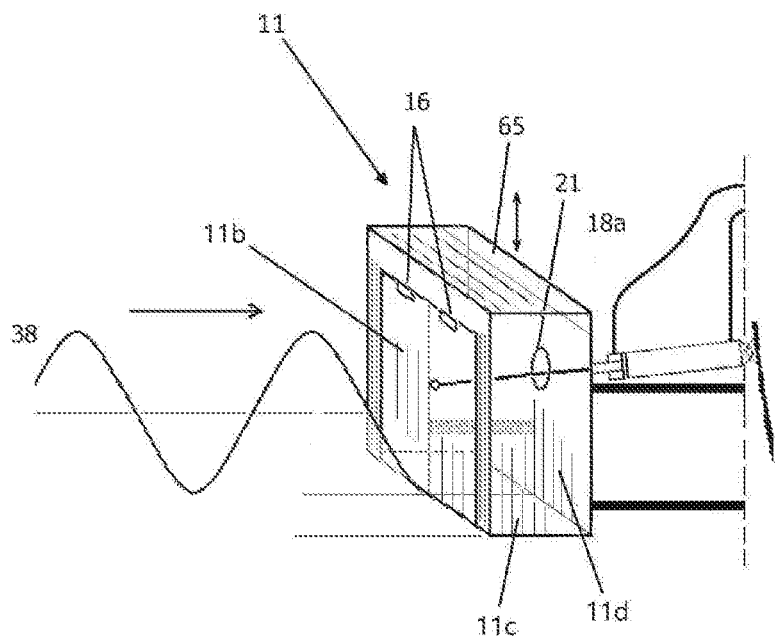
FIG. 9 is a partial perspective view of the wave energy converter apparatus showing the wave receiver unit of another embodiment of the invention with its front panel in a closed position.

In another embodiment of the invention, the front panel 11b of the wave receiver unit 11 is pivotally connected at a top edge by hinges 16 provided at a front top edge of the chamber as shown in FIG. 9. The front panel 11b is pivotable between a closed position and a partially open position.

Each side edge of the front panel 11b of the wave receiver unit 11 is attached with an extendible connector 17 which is secured to each front side edge of the chamber as shown in FIG. 8, to prevent sea water from getting inside the chamber. The extendible connector 17 is flexible which can be extended to allow the front panel 11b to be partially opened within the chamber and compressed to a folded position to allow the front panel 11b to be in a closed position.

When the front panel 11b of the wave receiver unit 11 moves from the closed position to the open position under wave loads, the shaft 18a of the connecting structure 18 will be pushed towards the rear panel 11d of the wave receiver unit 11, which will, in turn push the elongated rod 20b and the piston 20c towards the rear section or closed end of the cylinder 20a. The piston 20c compresses the hydraulic oil in the cylinder 20a as it moves to the rear section of the cylinder 20a. The pressurized oil behind the piston 20c will then move through the outlet port and will be transferred to the hydraulic accumulator 26.

When the front panel 11b moves back towards the front access opening 15 to a closed position, the shaft 18a will be pulled into the chamber of the wave receiver unit 11 which in turn pull the elongated rod 20b together with the piston 20c to move towards the open end of the cylinder 20a. The hydraulic fluid in the oil storage tank 27 will be drawn out into the cylinder 20a of the connection assembly 20 through the connecting pipe.

In another embodiment of the invention, the buoyant body 90 that floats on the surface of the body of water in the path of oncoming waves is connected with a hydraulic cylinder 92 having a piston through a connecting arm 91 for providing support for the wave energy converter apparatus 10 as shown in FIG. 1. The connecting arm 91 is connected with the buoyant body 90 at one end and the float unit 24 at the other end. The end of the supporting connecting arm 91 is attached to a buoyant joint 93 and the other end of the connecting arm 91 is attached to a float joint 94 that allow articulated motion of the wave energy converter apparatus 10. At least one supporting arm 86 such as a single acting cylinder may be attached to the connecting arm 91 at one end and another end attached to the float unit 24. The float joint 94 includes an extended part 88 attached to the float unit 24.

The buoyant body 90 floats in the wave surface and moves the connecting arm 91 upwardly and downwardly by the movement of the waves which then moves the piston of the hydraulic cylinder 92 to transfer the pressurized hydraulic oil through the connecting pipes into the accumulator 26.

In an embodiment of the invention, the wave energy converter apparatus 10 is anchored to the ocean floor 98 by an anchoring device 95 to keep the floating wave energy converter apparatus 10 to stay into position which it floats up and down, and between high tide and low tide levels. The anchoring device 95 prevents the wave energy converter apparatus 10 from drifting away by the ocean waves while the wave energy converter apparatus 10 is free to float at the ocean surface and move along with the movements of the waves passing through the apparatus 10.

The anchoring device 95 may include a flexible chain 96 having one end affixed to the ocean floor 98 and another end attached to the bottom part of the float unit 24 of the wave energy converter apparatus as shown in FIG. 1. A pressure system 99 is provided on the float unit 14 of the power conversion and generation module 12 and connected to the anchoring device 95, for generating pressurised hydraulic oil from the vertical motion of the float unit 24 floating on the ocean surface as shown in FIG. 1. During high tide level, the flexible chain 96 will be stretched thus causing the mechanism in the pressure system 99 to push the high pressure hydraulic fluid through an outlet port 99a by the connecting pipes into the accumulator.

Figure 6:
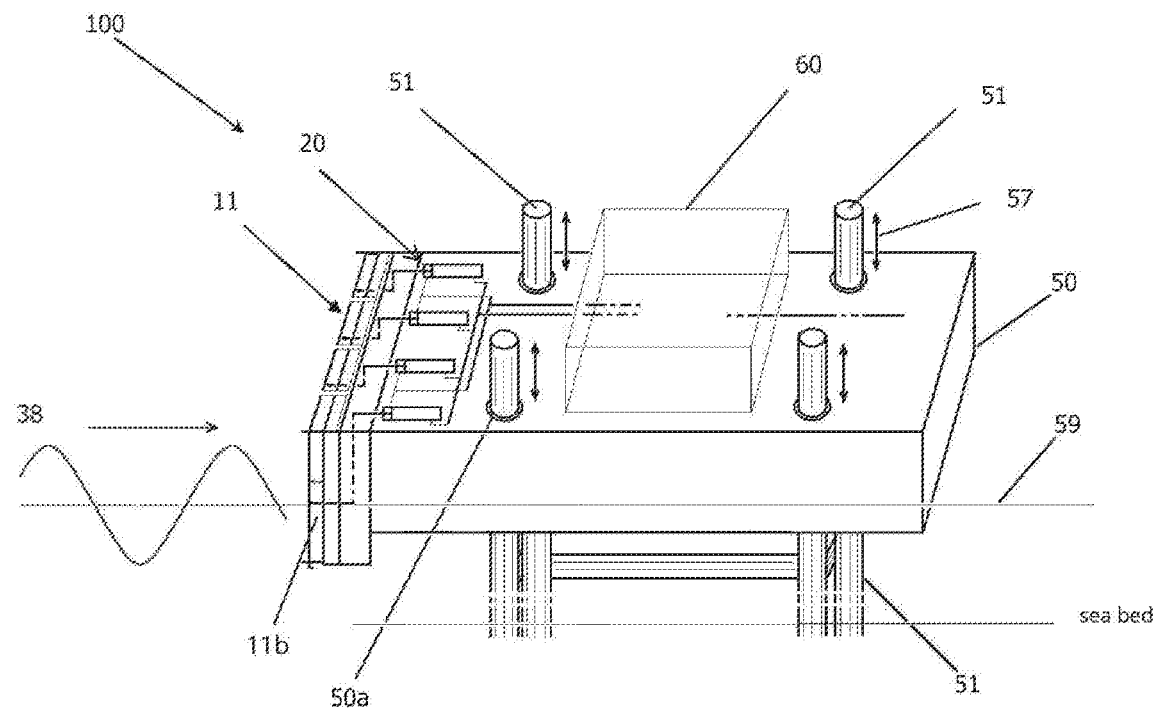
FIG. 6 is a perspective view of a wave energy converter system of an embodiment of the invention.
Figure 11:
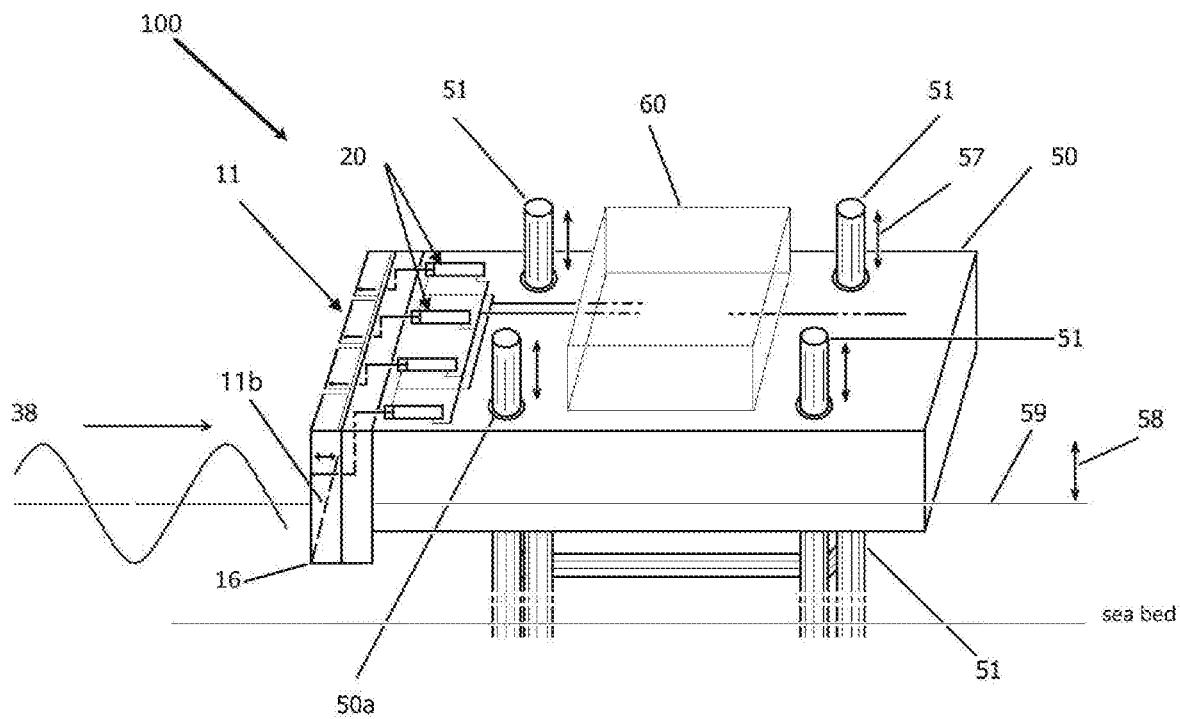
FIG. 11 is a perspective view of a wave energy converter system of another embodiment of the invention.
Figure 12:
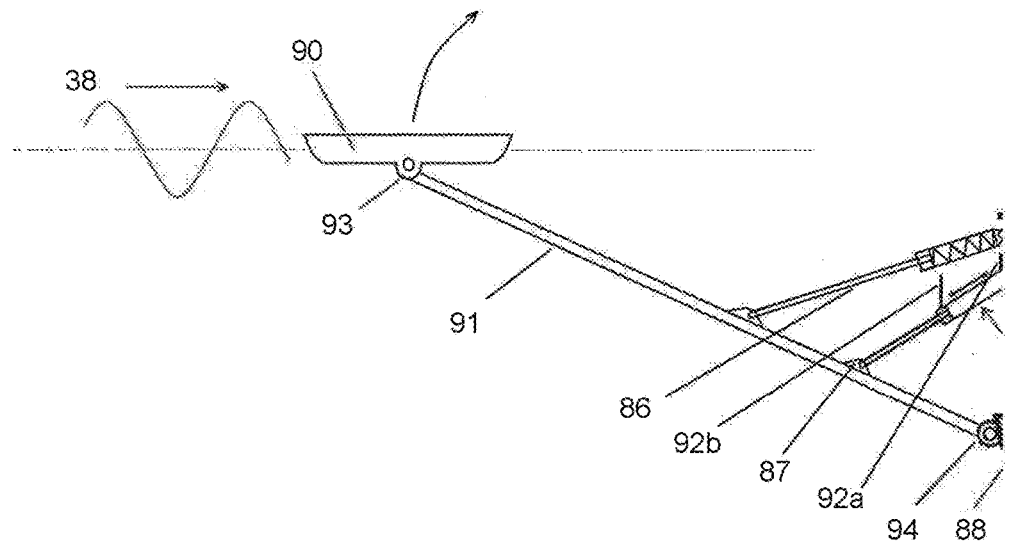
FIG. 12 is a partial side view of a buoyant body.
Figure 13:
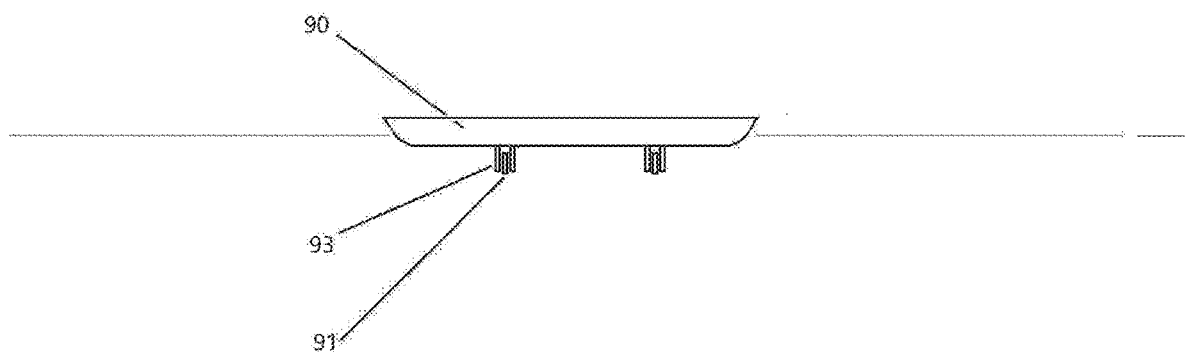
FIG. 13 is a partial front view of a buoyant body.

In another embodiment of the invention, the wave energy converter system 100 includes a platform 50 comprises a buoyancy body having a plurality of openings 50a for receiving a plurality of pillars 51 extending therethrough whereby each of the pillars 51 having its base end anchored to the bed of the sea or ocean (not shown) and its top end pierce through the opening 50a of the platform 50 as shown in FIGS. 6 and 11. The platform 50 moves upwards and downwards 57 about the pillars 51 in an oscillating motion in respect of the rise and fall 58 of water level 59.

A plurality of wave receiver units 11, constructed by two box-like chambers are disposed in a row at one side of the platform 50 which is partially submerged and facing the oncoming sea or ocean waves 38. Each wave receiver unit 11 is connected to a connection assembly 20. The hydraulic accumulator 26, oil storage tank 27, hydraulic motor 35 and electrical generator 36 are disposed in a control room 60 which is above the water level on top of the platform 50. The platform 50 may be a bed mounted platform or a floating platform. When a wave reaches the front side of the row of the wave receiver units 11, it effects an axial movement of each front panel 11b of the wave receiver unit 11 between the extended position and the compressed position as shown in FIG. 6. Each wave receiver unit 11 is disposed about the vertical axis and oriented transverse to the direction of the oncoming waves 38.

Figure 10:
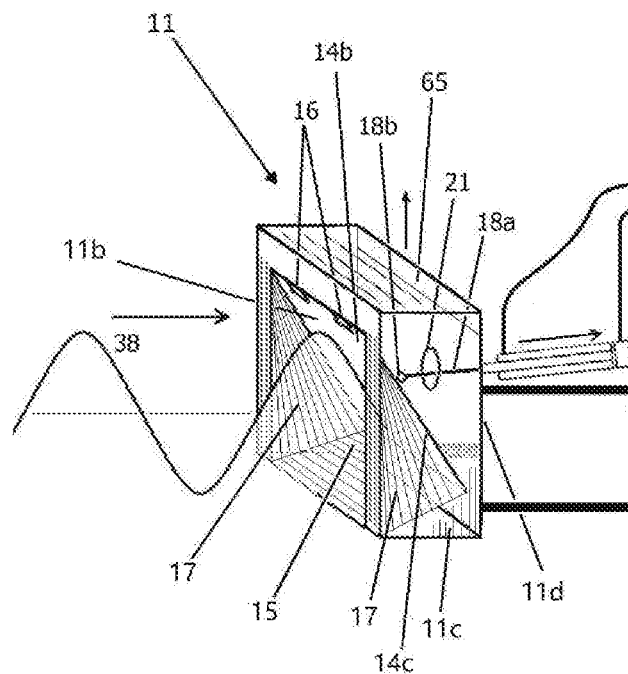
FIG. 10 is a partial perspective view of the wave energy converter apparatus with its front panel in an open position.

In another embodiment, a plurality of wave receiver units 11, a box-like chamber having movable hinged front panels 11b are disposed in a row at one side of the platform 50 which is partially submerged and facing the oncoming sea or ocean waves 38 as shown in FIG. 10. When the front panel 11b is in compressed or open position, the front panel 11 pushes the elongated rod 20b and the piston 20c of the connection assembly 20 to the closed end of the cylinder 20a via the connecting structure 18. The movement of the elongated rod 20b and the piston 20c will then press the hydraulic oil in the cylinder 20a through the outlet port into the hydraulic accumulators 26, which in turn drives the hydraulic motor 35 and simultaneously rotates the generator 36 to produce electricity. The electric power generated in the generator 36 is transferred to the transformer 42 on land 40 via a submarine cable 41. The transformer 42 will convert the electricity to right voltage then delivers through current outlet to grid.

Several embodiments of the wave receiver units are described herein. It should be understood that each embodiment of the wave receiver unit can be used in association with the connection assembly and the power conversion and generation module of the invention which is mounted on a barge or a platform. Additionally, various components and features of the different wave receiver units may be combined together or interchanged with one another as appropriate.

A method for converting energy from waves, the method comprising the step of providing a wave receiver unit 11 which is vertically disposed and partially submerged into a body of water in the path of oncoming waves. The wave receiver unit 11 includes a front panel 11b movable from one position to another in response to wave action on faces of the front panel of the wave receiver unit. The method further comprising of the steps of providing a connection assembly 20 having a cylinder 20a containing a hydraulic fluid and an elongated rod 20b with a piston 20c, and providing a power conversion and generation module 12 which is disposed on a float unit 24 that floats on the surface of the body of water. The connection assembly 20 includes a connecting structure 18 extending between the connection assembly and the front panel 11b the wave receiver unit for transferring the motion energy from the movements of the front panel caused by the waves acting on faces of the front panel to the elongated rod and the piston of the connection assembly.

The method includes the steps of providing a buoyant body 90 that floats on the surface of the body of water in the path of oncoming waves, the buoyant body 90 includes a connecting arm 91 having one end attached to a buoyant joint 93 of the buoyant body 90 and another end attached to a float joint 94 having an extended part 88 attached to the float unit 24. The buoyant body 90 is connected to a hydraulic cylinder 92 containing a hydraulic fluid and an elongated rod with a piston connected at a joint 87 of the connecting arm 91 and another end to the float unit 24.

The up-down movement of the buoyant body 90 would cause the movements of the connecting arm 91 and the piston of the hydraulic cylinder which result in pressurizing the hydraulic fluid in the cylinder and in pushing the high pressure hydraulic fluid through an outlet port 92a of the hydraulic cylinder 92 into the hydraulic motor 35 for driving the generator 36. The hydraulic fluid will flow into the cylinder through an inlet port 92b.

The method includes the steps of providing an anchoring device 95 having a flexible chain 96 and a rigid pole 97 for anchoring the float unit 24 of the wave energy converter apparatus to the ocean floor 98. During high tide level, the flexible chain 96 will be stretched thus causing the mechanism in the pressure system 99 to push the high pressure hydraulic fluid through an outlet port 99a of the connection assembly into the hydraulic motor 35 for driving the generator 36.

Although a preferred embodiment of the present invention has been described in detail by way of examples with reference to the accompanying drawings, it should be understood that various changes, substitutions, and modifications can be made herein without departing from the scope of the invention as defined by the appended claims.

The invention claimed is:

1. A wave energy converter apparatus (10) comprising:
a floatable wave receiver unit (11) comprising first and second chambers (34a, 34b) coupled to, and movable relative to each other in response to wave motion, to form an extensible and retractable wave receiver unit, the first chamber (34a) having a front panel (11b) attached to side panels (11c) with the front panel disposed to face wave motion and the second chamber (34b) having a rear panel (11d) attached to side panels (11e) and an open front end for containing and holding on to the first chamber (34a) to enable horizontal axial movement of the first chamber moving partially in or out of the second chamber, wherein a flexible corrugated shield (61) is peripherally disposed about the side panels (11c, 11e) of the first and second chambers (34a, 34b) to prevent water from entering the chambers;

a power conversion and generation module (12) having a hydraulic motor (35) and a generator (36) for generating electricity from wave motion, the module (12) disposed on a float unit (24) that floats in a body of water; and a connection assembly (20) connecting the wave receiver unit (11) to the power conversion and generation module (12), the connection assembly (20) including a hydraulic cylinder (20a) containing hydraulic fluid and connecting the hydraulic cylinder (20a) and an inner surface of the front panel (11b) of the first chamber such that wave motion energy is transferred to the hydraulic cylinder (20a) through the connecting structure (18) due to forward displacement of the first chamber (34a) into the second chamber (34b) caused by wave motion acting on the front panel (11b), said chamber displacement pressurizing the hydraulic fluid in the hydraulic cylinder (20a) into the hydraulic motor (35) for driving the generator (36).

2. The wave energy converter apparatus (10) according to claim 1, wherein the first chamber (34a) includes a closed rear end (11a), and the second chamber (34b) includes an open front end, the open front end of the second chamber being larger than the closed rear end (11a) of the first chamber (34a).

3. The wave energy converter apparatus (10) according to claim 1, wherein the chambers (34a, 34b) of the wave receiver unit (11) include:

a resilient member (19) with one end attached at an inner wall of the rear panel (11d) of the second chamber (34b) and the other end facing an external surface of the closed rear end (11a) of the first chamber (34a);

an opening (65) provided at a top part of the rear panel (11d) for entry of air into the wave receiver unit (11) during a wave trough and for exit of air out of the wave receiver unit (11) during a wave crest; and a water outlet (36) provided at the upper end of the rear panel (11d) having an outlet pipe (37) connected thereto and extending to the bottom of the rear panel (11d) of the wave receiver unit (11), for channeling excess water out of the chamber.

4. The wave energy converter apparatus (10) according to claim 3, wherein the resilient member (19) comprises at least one spring member.

5. The wave energy converter apparatus (10) according to claim 1, wherein the wave receiver unit (11) further comprises:

a sliding mechanism (34) with a base plate (70) having inwardly facing spaced apart guiding rails (70a) at an inner surface of each side panel (11e) of the second chamber (34b) and a base plate (80) at an outer surface of each side panel (11c) of the first chamber (34a) having an outwardly facing fitting rail (80a) slidably fitted between the pair of guiding rails (70a).

6. The wave energy converter apparatus (10) according to claim 1, wherein the hydraulic cylinder (20a) of the connection assembly (20) includes a closed end at which the float unit (24) is attached and an open end having an elongated rod (20b) attached at one end to a piston (20c) in the hydraulic cylinder (20a) and the other end extending through the open end of the hydraulic cylinder (20a) to the front panel (11b) of the first chamber (34a) via an opening (21) provided at the rear panel (11d) of the second chamber (34b) and a corresponding opening (21a) at the closed rear end (11a) of the first chamber (34a) of the wave receiver unit (11).

7. The wave energy converter apparatus (10) according to claim 1, wherein the connecting structure (18) comprises a shaft (18a) having one end to which the elongated rod (20b) of the hydraulic cylinder (20a) is attached and the other end provided with a pivotal connection (18b) for pivotably attaching to an inner surface of the front panel (11b) of the wave receiver unit (11).

8. The wave energy converter apparatus (10) according to claim 1, wherein the power conversion and generation module (12) further comprises:

at least one hydraulic accumulator (26) for accumulating high-pressure hydraulic fluid fed from the connection assembly (20) via a first connecting pipe (22) and a pipe extension (22a) prior to transferring the high-pressure fluid to the hydraulic motor (35); and an oil storage tank (27) for storing and providing hydraulic fluid to the connection assembly (20) via a pipe extension (22b) and the first connecting pipe (22) through an outlet port, and via a pipe extension (23a) and a second connecting pipe (23) through an inlet port of the cylinder (20a).

9. The wave energy converter apparatus (10) according to claim 1, wherein the connection assembly (20) includes an outlet port provided adjacent the closed end and connected with the first connecting pipe (22), and an inlet port provided adjacent the open end and connected with the second connecting pipe (23).

10. The wave energy converter apparatus (10) according to claim 1, wherein the wave receiver unit (11) is made of a corrosion-proof metal or a synthetic material or a water-resistant material.

11. The wave energy converter apparatus (10) according to claim 1, wherein the float unit (24) is a barge.

12. The wave energy converter apparatus (10) according to claim 1, wherein the wave energy converter apparatus (10) further comprises an anchoring device (95) having a flexible chain (96) with one end affixed to the sea or ocean floor (98) and the other end attached to the float unit (24) of the power conversion and generation module (12), whereby the flexible chain (96) is extended into a pressure system (99) to convert motion energy into pressurised hydraulic liquid, which is transferred through an outlet port (99a) to the accumulator (26).

13. A wave energy converter system (100) including the wave energy converter apparatus (10), the system comprising:

a platform (50) including a plurality of pillars (51), whereby the base end of each of the pillars (51) is anchored to a bed of a body of water and the top end is attached to the platform (50);

a plurality of floatable wave receiver units (11) arranged in a row and disposed vertically at one side of the platform (50) in the path of oncoming waves (38), wherein each of the wave receiver units (11) comprises first and second chambers (34a, 34b) coupled to, and movable relative to each other in response to wave motion, to form an extensible and retractable wave receiver unit, the first chamber (34a) having a front panel (11b) attached to side panels (11c) with the front panel facing wave motion and the second chamber (34b) having a rear panel (11d) attached to side panels (11e) and an open front end for receiving the first chamber (34a) to enable horizontal axial movement between the first and second chambers, wherein a flexible corrugated shield (61) is disposed peripherally about the side panels (11c, 11e) of the first and second chambers (34a, 34b) to prevent water from entering the chambers;

a power conversion and generation module (12) disposed on the platform (50), which includes a hydraulic motor (35) and a generator (36) for generating electricity from wave motion, a plurality of connecting assemblies (20) each including a hydraulic cylinder (20a) containing hydraulic fluid and a connecting structure (18) connected to the hydraulic cylinder (20a) and an inner surface of the front panel (11b) of the first chamber such that wave motion energy is transferred to the hydraulic cylinder (20a) through the connecting structure (18) due to forward displacement of the first chamber (34a) into the second chamber (34b) caused by wave motion acting on the front panel (11b), said chamber displacement pressurizing the hydraulic fluid in the hydraulic cylinder (20a) into the hydraulic motor (35) for driving the generator (36).

14. The wave energy converter system (100) according to claim 13, wherein the platform (50) comprises a buoyancy body and the plurality of pillars (51) extends through a plurality of openings (50a) provided in the platform (50).

15. A method for converting energy from waves, the method comprising the steps of:

providing a floatable wave receiver unit (11) comprising first and second chambers (34a, 34b) coupled to, and movable relative to each other in response to wave motion, to form an extensible and retractable wave receiver unit, the first chamber (34a) having a front panel (11b) attached to side panels (11c) with the front panel facing wave motion and the second chamber (34b) having a rear panel (11d) attached to side panels (11e) and an open front end for receiving the first chamber to enable horizontal axial movement between the first and second chambers, wherein a flexible corrugated shield is disposed peripherally about the side panels (11c, 11e) of the first and second chambers (34a, 34b) to prevent water from entering the chambers;

providing a power conversion and generation module (12) having a hydraulic motor (35) and a generator (36) for generating electricity from wave motion, the module (12) disposed on a float unit (24) that floats in a body of water, and connecting the wave receiver unit (11) to the power conversion and generation module (12) with a connection assembly (20) comprising a hydraulic cylinder (20a) containing hydraulic fluid and a connecting structure (18) connected to the hydraulic cylinder (20a) and an inner surface of the front panel (11b) of the first chamber such that wave motion energy is transferred to the hydraulic cylinder (20a) through the connecting structure (18) due to forward displacement of the first chamber (34a) into the second chamber (34b) caused by wave motion acting on the front panel (11b), said chamber displacement pressurizing the hydraulic fluid in the hydraulic cylinder (20a) into the hydraulic motor (35) for driving the generator (36).

16. The wave energy converter apparatus (10) according to claim 1, wherein the apparatus (10) further comprises a buoyant body (90) that floats on the surface of the body of water and is attached to the float unit (24) of the power conversion and generation module (12).

17. The wave energy converter apparatus (10) according to claim 16, wherein the buoyant body (90) of the wave energy converter apparatus comprises:

a connecting arm (91) having one end attached to a buoyant joint (93) of the buoyant body (90) and another end attached to a float joint (94) having an extended part (88) attached to the float unit (24); and a hydraulic cylinder (92) connected with the buoyant body (90) through the connecting arm (91) in that motion energy from movement of the buoyant body (90) caused by waves is transferred to the hydraulic cylinder (92), resulting in pressurizing of the hydraulic fluid in the cylinder and in pushing the pressurized hydraulic fluid through an outlet port (92b) of the hydraulic cylinder (92) into the hydraulic motor (35) for driving the generator (36).

18. The wave energy converter apparatus (10) according to claim 17, wherein the hydraulic cylinder (92) comprises at least one supporting arm (86) having one end attached to the joint (87) of the connecting arm (91) and another end attached to the float unit (24).

* * * * *